Oct. 4, 1960 — A. F. BRUCE — 2,954,658
REEL TYPE LAWN TRIMMER
Filed May 14, 1959 — 2 Sheets-Sheet 1
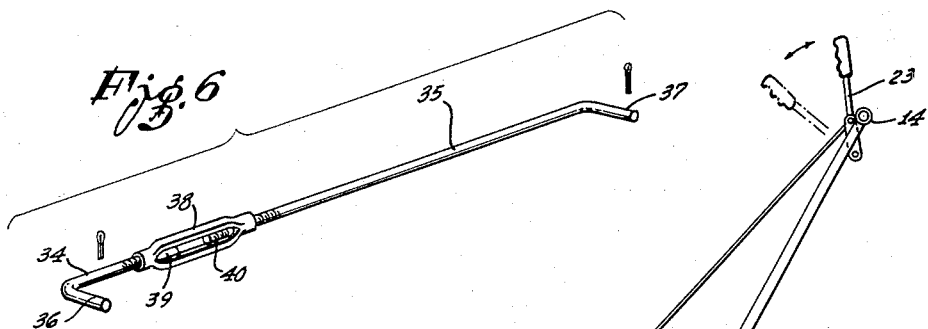
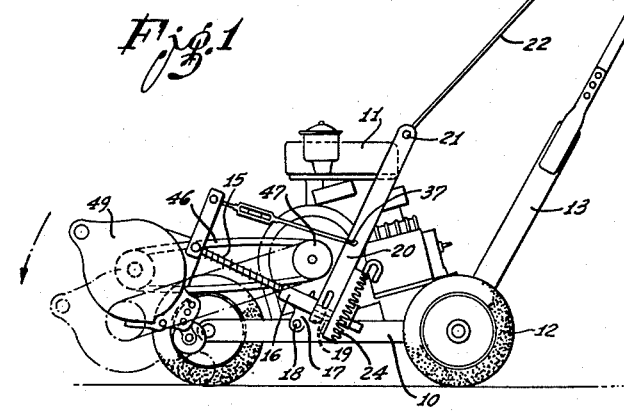
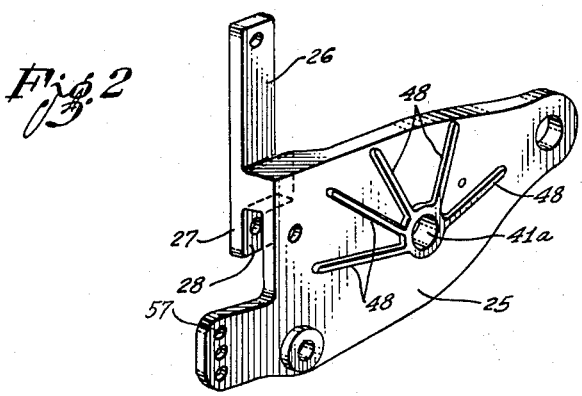
Alvin F. Bruce
INVENTOR.
BY Gene W. Arant
Attorney, Oct. 4, 1960
A. F. BRUCE
2,954,658
REEL TYPE LAWN TRIMMER
Filed May 14, 1959
2 Sheets-Sheet 2
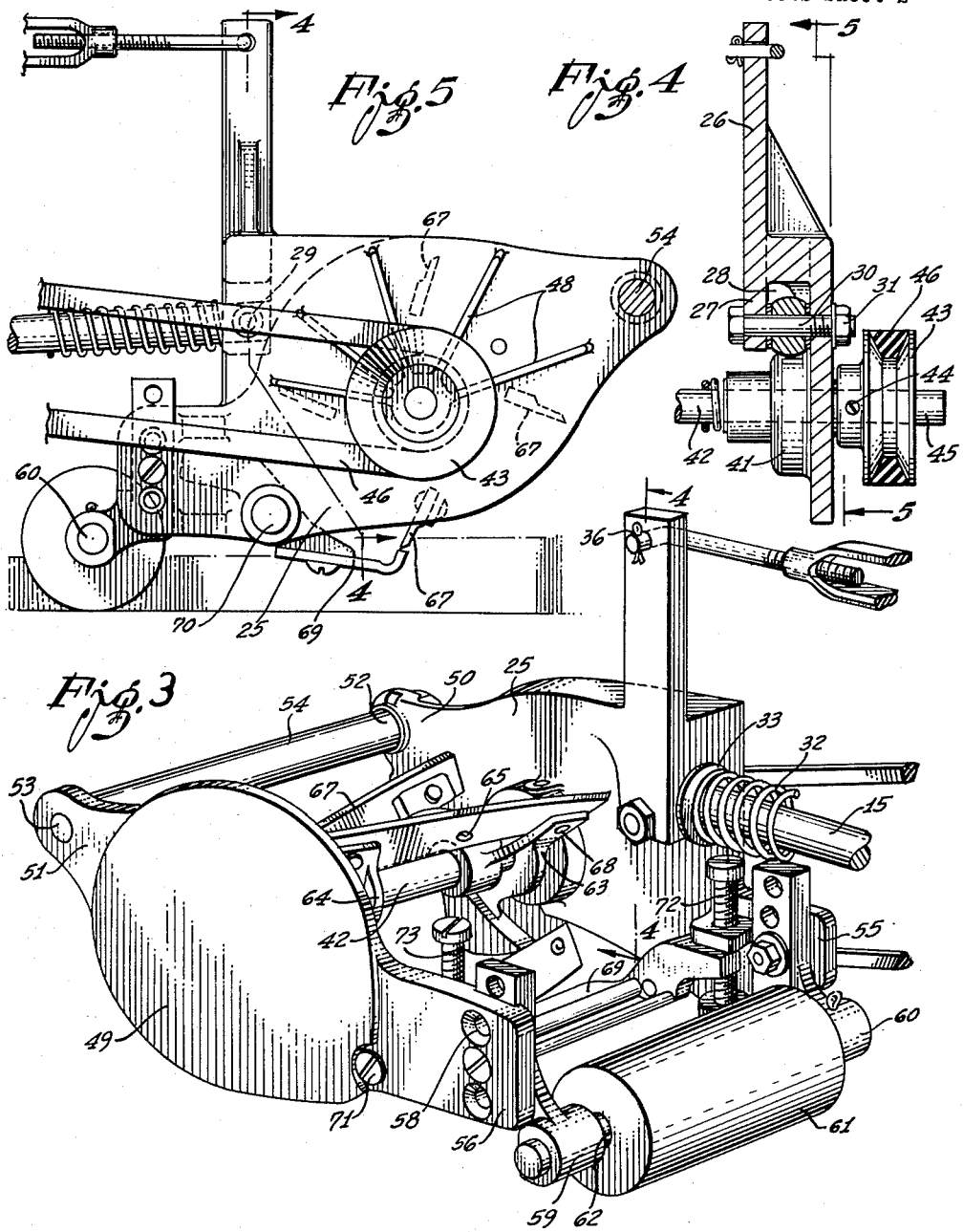
Alvin F. Bruce
INVENTOR.
BY Gene W. Arant
Attorney,

United States Patent Office 2,954,658
Patented Oct. 4, 1960

2,954,658

REEL TYPE LAWN TRIMMER

Alvin F. Bruce, 409 S. Holly, Compton, Calif.

Filed May 14, 1959, Ser. No. 813,307

1 Claim. (Cl. 56—26)

This invention relates to a lawn trimmer, and particularly to a mower type trimmer adaptable for quick detachable connection with a power driven edger.

Power driven lawn trimmers and edgers have become so well known and popular that little description thereof is required. A typical machine comprises a wheel supported frame upon which a small gasoline engine is mounted. A combined trimmer and edger is pivotally supported on the frame for manually controlled disposition into operating and transportation position. A pulley and belt driving connection is provided between the combined edger and trimmer and the small engine. A single bladed cutter is supported for vertical edging position when desired. The same bladed element may be quickly disposed in a horizontal position to accomplish a trimming operation with little or no adjustment of the belt and pulley driving connection.

These conventional devices are entirely satisfactory as edgers but they fail almost completely as trimmers. The bladed element when disposed horizontally is not fashioned or arranged to cut or trim with the known efficiency of the popular cylinder type bladed mower.

There are many hand and power propelled mowers but such standard devices are not adaptable for specific trimming operations close to fences, walls or shrubbery. The supporting frames or wheels of these conventional mowers prevent accurate disposal of overhanging grass along the edges of paths and flower beds.

Hand propelled cylinder type bladed mowers have been provided heretofore but such devices are supported by a single wheel which renders their use unwieldy and physically difficult.

This invention overcomes the disadvantages of prior structures by adapting a cylinder type trimming mower to power driven edging devices for optional use therewith. The mower is capable of quick attachment and detachment on the conventional power edger and utilizes most of the driving and control elements thereof. When attached to the power edger, the mower is projected laterally therefrom in detached position for accurate and close trimming operation. The cylinder type knives and cooperating blades may be manually lowered into trimming position when desired or manually moved to non-operating position for transportation purpose.

One of the main objects of the invention is to provide a cylinder type trimming mower adaptation for power driven edgers.

Another object of the invention is to provide a supporting device for a trimming mower that permits quick detachable connection thereof with a power driven edger.

Still another object of the invention is in the provision of a mounting plate and attachment mechanism for a trimming mower that adapts same for support and driving connection on a power edger.

A further object of the invention is in the provision of a special adapter plate that provides lateral support for a trimming mower as well as detachable connecting and driving engagement with a power edger.

With the foregoing objects in view, and such other objects and advantages as will become apparent to those skilled in the art to which this invention relates as this specification proceeds, the invention consists essentially in the arrangement and construction of the parts all as hereinafter more particularly described, reference being had to the accompanying drawing in which:

Figure 1 is an elevation view of the trimming mower attached to a power edger;

Figure 2 is an enlarged perspective view of the adapter plate;

Figure 3 is an enlarged rear perspective view of the trimming mower;

Figure 4 is a sectional view taken along line 4—4 of Figures 3 and 5;

Figure 5 is an elevational view taken from the position indicated by the arrows 5—5 of Figure 4; and Figure 6 is an enlarged perspective detail of the adjustable mower support.

Referring to Figure 1 of the drawing, the quick detachable trimming mower of this invention is shown adapted to the chassis of a conventional power driven edger and trimmer. The combined edger and trimmer has been removed from the wheeled engine support and has not been shown in the drawing.

An engine chassis or base 10 supports a small gasoline engine or power element 11. The base 10 is suitably mounted on plural wheels 12 in the usual manner and thus a two wheeled chassis is provided. The engine supporting frame or base 10 is manually propelled by means of a rearwardly extending bar 13 and a handle grip 14.

A conventional combined trimmer and edger support includes a forwardly projecting rod 15 supported in a tubular portion 16 of a bracket 17. The bracket 17 has a releasable pivotal connection 18 on the side of the engine base and chassis 10. The rod 15 slideably engages a bore 19 in the lower end of a right angularly projecting arm or lever 20. The upwardly and rearwardly disposed arm 20 has a pivotal connection 21 with a rod 22 connected to chassis propelling bar 13 by means of a conventional manually operated lever and control handle 23. The details of the manually operated adjusting means have not been shown but it is believed clear that manual movement of handle 23 will raise and lower the trimming and edger suspension rod 15 as desired.

A device 24 of conventional design is provided for rotating the rod 15 in its tubular bores 16 and 18 and thus moving a standard bladed edger and trimmer to desired position. Device 24 includes a plurality of teeth circumferentially spaced about the end of rod 15, and as the rod rotates a pin carried by the rod end is seated in a selected oppositely disposed pair of said teeth. However, such mechanism has no use in connection with this invention and it is only desired that the suspension rod 15 be manually raised and lowered for trimming mower operation and transportation.

The manually controlled suspension mechanism described is entirely conventional and use is made of this excellent design for attaching and adapting the trimming mower of the invention thereto. The suspension rod 15 and connected mechanism is quickly detached from the chassis 10 by releasing the pivot 18. The mechanism is released from the actuating handle by simple release of pivot element 21.

The standard combined edger and trimmer normally attached and forming a part of the base and power element has been removed with the suspension mechanism therefor. Applicant duplicates the conventional suspension mechanism as a part of his trimming mower adaptation so that detachability of elements to provide either an edger or trimming mower is relatively simple and quickly accomplished.

A special adapter plate 25 supports the trimming mower of this invention and provides a connecting and driving means with the standard engine and forwardly projecting rod 15. The adapter plate 25 has an upwardly projecting arm 26 integrally formed therewith. A lower projecting end 27 of the arm 26 forms a yoke 28 with the adapter plate 25. The supporting end of the rod 15 is apertured at 29 and loosely surrounds a supporting pivot 30 bolted securely at 31 within the yoke 28. A powerful shock absorbing coil spring 32 surrounds the rod 15 and is disposed between the bracket 17 and a washer 33 on the rear face of the yoke 28.

An adjustable support for the adapter plate 25 and the suspension mechanism is provided by dual tie-rods 34 and 35 having cotter-keyed connections at 36 and 37 with arm 26 and lever 20 respectively. A tie bolt 38 threadedly receives the ends 39 and 40 of tie rods 34 and 35 respectively and thus provides a degree of adjustment and support of the adapter plate 25 and trimming mower sufficient to compensate for belt extension or wear.

The trimming mechanism of the reel type mower is somewhat standard but the driving elements are now associated with the adapter plate 25 and the power edger structure. The adapter plate 25 has a hub 41 on the mower side providing a substantial shaft bore or bearing 41a for a reel shaft 42. The shaft 42 has a pulley 43 keyed at 44 to the stub driving end 45 thereof. A standard belt 46 connects the pulley 43 with a driving pulley 47 on the power shaft of the gasoline engine 11.

The adapter plate 25 has a series of radially extending exterior reinforcing ribs 48 about the mower shaft bearing 41a. A spaced side plate 49 supports the outer end of the shaft 42. The adapter plate 25 and side plate 49 have forwardly projecting ears 50 and 51 which support the outer ends 52 and 53 respectively of a frame shaft 54. Rearwardly extending ears 55 and 56 on plates 25 and 49 respectively are apertured in a plural manner at 57 and 58 to adjustably support conventional roller supporting bearings 59 and 60 respectively. The usual wooden roller 61 has a shaft 62 supported in the adjustable bearing supports 59 and 60. Reel spiders 63 and 64 are keyed to the mower shaft 42 in the manner shown at 65. Plural spiral cutting knives 67 are attached to the spaced reel heads in the usual manner shown at 68.

A standard ledger plate 69 is adjustably mounted at 70 and 71 in adapter plate 25 and side plate 49 respectively. Additional rear blade adjustment of a conventional nature is provided in dual mechanisms 72 and 73. The cutting position of the reel knives 67 and the rear blade 69 is clearly shown in Figure 5 and although entirely standard, this trimming method is greatly superior to the trimming action of any combined edger and trimmer blade mechanism.

The operation of the device is simple. The means for adjusting the trimming mower knife and blade mechanism is well known. The trimming mower with its elevated side plate 49 can be used alongside any kind of wall or fence inasmuch as the power drive and supporting mechanism is away from the trimming area.

The pulley and belt drive requires no explanation and the manual elevation of the suspension rod 15 to control operative and non-operating position of the trimming mower is exactly the same as in a standard power driven edger and trimmer.

The unique adaptation and suspension of the trimming mower in a quick detachable manner on a standard power edger and trimmer has been described earlier herein. It is believed sufficient to say that only a short time is required to convert a power edger into a power reel type trimming mower capable of successful operation.

Since various modifications can be made in my invention as here above described, and many apparently widely different embodiments of same made within the spirit and scope of the claim without departing from such spirit and scope, it is intended that all matter contained in the accompanying specification shall be interpreted as illustrative only and not in a limiting sense.

I claim:

A lawn trimmer comprising: a wheeled chassis supporting a power unit; a suspension mechanism including a substantially vertical actuating arm having a transverse bore in its lower end, a suspension rod slidably received within said bore and projecting forwardly and upwardly therefrom, and means operatively asosciated with said arm for selectively tilting said actuating arm so as to raise and lower the forward end of said suspension rod; an adapter plate pivotally mounted on the forward end of said suspension rod, said adapter plate having an upwardly extended positioning arm and a mower shaft supporting hub; an adjustable tie rod assembly extending substantially parallel to said suspension rod between said positioning arm and said actuating arm; a helical spring surrounding said suspension rod for inhibiting movement of said adapter plate toward said actuating arm; a laterally extending reel trimming mower having shaft attached to said plate with said shaft extending inwardly through said hub; and a belt and pulley connection between said mower shaft inner end and said power unit.

References Cited in the file of this patent

UNITED STATES PATENTS

| | | |
|---|---|---|
| 1,251,022 | Henriksen | Dec. 25, 1917 |
| 2,739,437 | True | Mar. 27, 1956 |
| 2,787,107 | Strasel | Apr. 2, 1957 |
| 2,862,344 | Caudle et al. | Dec. 2, 1958 |
| 2,909,021 | McLane | Oct. 20, 1959 |